US 9,989,150 B2

(12) United States Patent
Yamanaka et al.

(10) Patent No.: US 9,989,150 B2
(45) Date of Patent: Jun. 5, 2018

(54) CONTROL DEVICE FOR BELT-TYPE CONTINUOUSLY VARIABLE TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Manabu Yamanaka, Machida (JP); Hironori Miyaishi, Kawasaki (JP)

(73) Assignees: JATCO Ltd, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 297 days.

(21) Appl. No.: 14/777,641

(22) PCT Filed: Feb. 3, 2014

(86) PCT No.: PCT/JP2014/052375
§ 371 (c)(1),
(2) Date: Sep. 16, 2015

(87) PCT Pub. No.: WO2014/148124
PCT Pub. Date: Sep. 25, 2014

(65) Prior Publication Data
US 2016/0290502 A1    Oct. 6, 2016

(30) Foreign Application Priority Data

Mar. 22, 2013  (JP) .................................. 2013-059807

(51) Int. Cl.
*F16H 61/662*   (2006.01)
*B60K 6/48*     (2007.10)
(Continued)

(52) U.S. Cl.
CPC ............. *F16H 61/662* (2013.01); *B60K 6/48* (2013.01); *B60K 6/543* (2013.01); *B60L 11/14* (2013.01);
(Continued)

(58) Field of Classification Search
CPC ............ F16H 61/662; F16H 61/66272; B60W 30/18072
See application file for complete search history.

(56) References Cited

U.S. PATENT DOCUMENTS 4,730,522 A    3/1988  Morimoto
5,569,114 A    10/1996 Matsuda et al.
(Continued)

FOREIGN PATENT DOCUMENTS

JP    62-052264 A    3/1987
JP    01-098747 A    4/1989
(Continued)

OTHER PUBLICATIONS

Machine Translation of JP-01-098747-A, Published Apr. 17, 1989, Applicant Fuji Heavy Ind Ltd.
(Continued)

*Primary Examiner* — Edwin A Young
(74) *Attorney, Agent, or Firm* — Foley & Lardner LLP

(57) ABSTRACT

A belt-type continuously variable transmission is equipped with a belt wrapped around across a primary pulley and a secondary pulley, and a CVT control unit for controlling pulley hydraulic pressures to the primary pulley and the secondary pulley. The CVT control unit determines whether an operating state is a driving state where the direction of an input torque inputted to the belt-type continuously variable transmission is from a driving source or a coasting state where the input torque direction is from drive road wheels. The pulley hydraulic pressure for the input torque for when (Continued)

it is determined that the operating state is the coasting state is set higher than the pulley hydraulic pressure for the input torque for when it is determined that the operating state is the driving state, thereby suppressing a slippage of the belt.

8 Claims, 4 Drawing Sheets

(51) Int. Cl.
  B60K 6/543      (2007.10)
  B60L 11/14      (2006.01)
  B60L 15/20      (2006.01)
  B60W 10/08      (2006.01)
  B60W 10/10      (2012.01)
  B60W 20/00      (2016.01)
  F16H 59/68      (2006.01)
  F16H 61/00      (2006.01)
  F16H 61/02      (2006.01)
  B60W 10/107     (2012.01)
  B60W 30/18      (2012.01)
  B60W 10/06      (2006.01)
  B60W 10/188     (2012.01)
  B60W 20/30      (2016.01)
  F16H 9/18       (2006.01)

(52) U.S. Cl.
  CPC ............ *B60L 15/20* (2013.01); *B60W 10/06* (2013.01); *B60W 10/08* (2013.01); *B60W 10/10* (2013.01); *B60W 10/107* (2013.01); *B60W 10/188* (2013.01); *B60W 20/00* (2013.01); *B60W 20/30* (2013.01); *B60W 30/18072* (2013.01); *F16H 9/18* (2013.01); *F16H 59/68* (2013.01); *F16H 61/00* (2013.01); *F16H 61/02* (2013.01); *F16H 61/0213* (2013.01); *F16H 61/0265* (2013.01); *F16H 61/66272* (2013.01); *B60W 2030/1809* (2013.01); *B60W 2510/0623* (2013.01); *B60W 2510/0638* (2013.01); *B60W 2510/0657* (2013.01); *B60W 2510/083* (2013.01); *B60W 2520/10* (2013.01); *B60W 2540/10* (2013.01); *B60W 2540/12* (2013.01); *B60W 2710/0666* (2013.01); *B60W 2710/083* (2013.01); *B60W 2710/1083* (2013.01); *B60W 2710/182* (2013.01); *B60Y 2200/92* (2013.01); *F16H 2061/0227* (2013.01); *Y02T 10/6221* (2013.01); *Y02T 10/7258* (2013.01); *Y02T 10/76* (2013.01); *Y10S 903/918* (2013.01)

(56) References Cited

U.S. PATENT DOCUMENTS

2004/0063539 A1    4/2004   Endo et al.
2010/0210412 A1*   8/2010   Kojima ................ F16H 61/143
                                                            477/38

FOREIGN PATENT DOCUMENTS

JP    2001-330126 A    11/2001
JP    2006-336796 A    12/2006
JP    2013-053641 A     3/2013

OTHER PUBLICATIONS

Machine Translation of JP-2001-330126-A, Published Nov. 30, 2001, Applicant Toyota Motor Corp.
Machine Translation of JP-2006-336796-A, Published Dec. 14, 2006, Applicant Nissan Motor Co Ltd.
Machine Translation of JP-2013-053641-A, Published Mar. 21, 2013, Applicant Nissan Motor Co Ltd.
Machine Translation of JP-62-052264-A, Published Mar. 6, 1987, Applicant Fuji Heavy Ind Ltd.

* cited by examiner

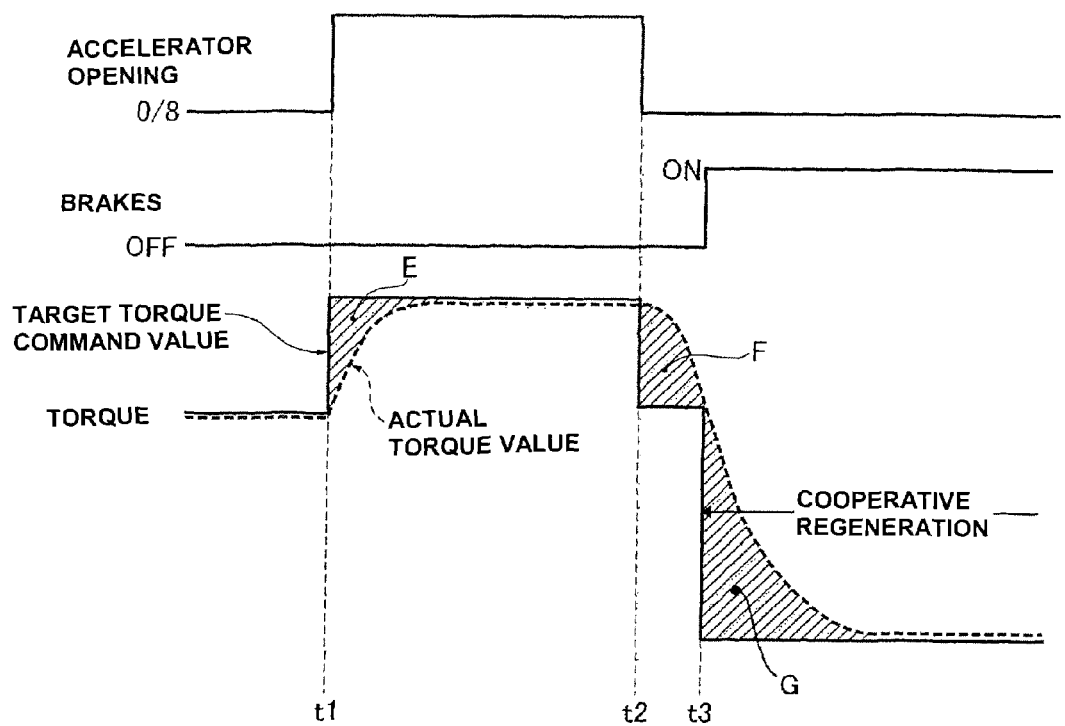

US 9,989,150 B2

CONTROL DEVICE FOR BELT-TYPE CONTINUOUSLY VARIABLE TRANSMISSION

TECHNICAL FIELD

The present invention relates to a control device for a belt-type continuously variable transmission configured to control pulley hydraulic pressures of a primary pulley and a secondary pulley across which a belt is wrapped around.

BACKGROUND ART

In a control device for a belt-type continuously variable transmission, a technology, in which switching between a normal hydraulic-pressure versus input-torque map (a first map) and a reduced hydraulic-pressure versus input-torque map (a second map) whose hydraulic pressure is reduced in relation to an input torque occurs depending on an accelerator opening and an accelerator opening speed, is well known (see Patent document 1).

However, the previously-discussed prior-art device was aimed at a driving state in which torque is input from a driving source to a belt-type continuously variable transmission by operation of an accelerator. Hence, control of pulley hydraulic pressure for an input torque is not evident in a coasting state in which torque is input from drive road wheels to the belt-type continuously variable transmission. When the decision that the accelerator has been released is made, pulley hydraulic pressure is controlled by the use of the second map in a coasting state. For instance, in the case that the second map (the hydraulic-pressure reduction map) is used and the operating range is changed from a D range (drive range) in which a ratio change is automatically made by shift operation to a L range (low range) in which the transmission ratio is fixed to a low speed side, the magnitude of torque for coasting, inputted from the drive road wheels, becomes greater and thus a lack of belt clamping force that clamps the belt occurs. This leads to the problem such as a belt slippage in which relative movement between the pulley and the belt occurs.

CITATION LIST

Patent Literature

Patent document 1: Japanese Patent Provisional Publication No. 2006-336796

SUMMARY OF INVENTION

It is, therefore, in view of the previously-described drawbacks, an object of the invention to provide a control device for a belt-type continuously variable transmission capable of suppressing a belt slippage that results in a belt-transmission torque loss in a coasting state in which torque is input from drive road wheels.

In a control device for a belt-type continuously variable transmission of the invention, the belt-type continuously variable transmission is equipped with a primary pulley connected to a driving source, a secondary pulley connected to drive road wheels, a belt wrapped around across the primary pulley and the secondary pulley, and a pulley hydraulic pressure control means for controlling pulley hydraulic pressures to the primary pulley and the secondary pulley.

The control device has an operating state determination means for determining whether an operating state is a driving state where the direction of an input torque inputted to the belt-type continuously variable transmission is a direction in which the drive road wheels are driven by the input torque from the driving source or a coasting state where the input torque direction is a direction in which the driving source is co-rotated by the input torque from the drive road wheels.

The pulley hydraulic pressure control means sets the pulley hydraulic pressure for the input torque for when it is determined that the operating state is the coasting state higher than the pulley hydraulic pressure for the input torque for when it is determined that the operating state is the driving state.

Therefore, when it is determined that the operating state is a coasting state where the input torque direction is a direction in which the driving source is co-rotated by the input torque from the drive road wheels, within the pulley hydraulic pressure control means the pulley hydraulic pressure for the input torque is set higher than the pulley hydraulic pressure for the input torque for when it is determined that the operating state is a driving state. That is to say, for instance when the magnitude of input torque from the drive road wheels becomes greater on the assumption that, in a coasting state, the pulley hydraulic pressure for the input torque for the driving state, is just applied, the belt clamping force, which clamps the belt, tends to lack with respect to a transmitted torque to be transmitted via the belt toward the driving source. Thus, there is a possibility for a belt slippage to occur owing to relative movement between the pulley and the belt.

In contrast to the above, by setting the pulley hydraulic pressure for the coasting state higher than the pulley hydraulic pressure for the input torque for the driving state, it is possible to ensure the belt clamping force that clamps the belt and to suppress a belt slippage even when the magnitude of input torque from the drive road wheels becomes greater. Hence, by suppressing the belt slippage and by reducing the belt-transmission torque loss, it is possible to ensure the effectiveness of engine braking on engine vehicles and to ensure the high regenerative power generation efficiency on electric vehicles.

As a result of this, in a coasting state in which torque is input from drive road wheels, it is possible to suppress a belt slippage that results in a belt-transmission torque loss.

BRIEF DESCRIPTION OF DRAWINGS

FIG. 5 is a time chart illustrating respective characteristics about accelerator opening, brakes, a target torque command value (a target driving torque command value and a target braking torque command value), and an actual torque value (an actual driving torque value and an actual braking torque value), obtained when, in the FF hybrid vehicle to which the control device of the first embodiment is applied, a series of operations has been made from accelerator depressing operation via accelerator releasing operation to brake depressing operation, in that order.

DESCRIPTION OF EMBODIMENTS

Figure 1:
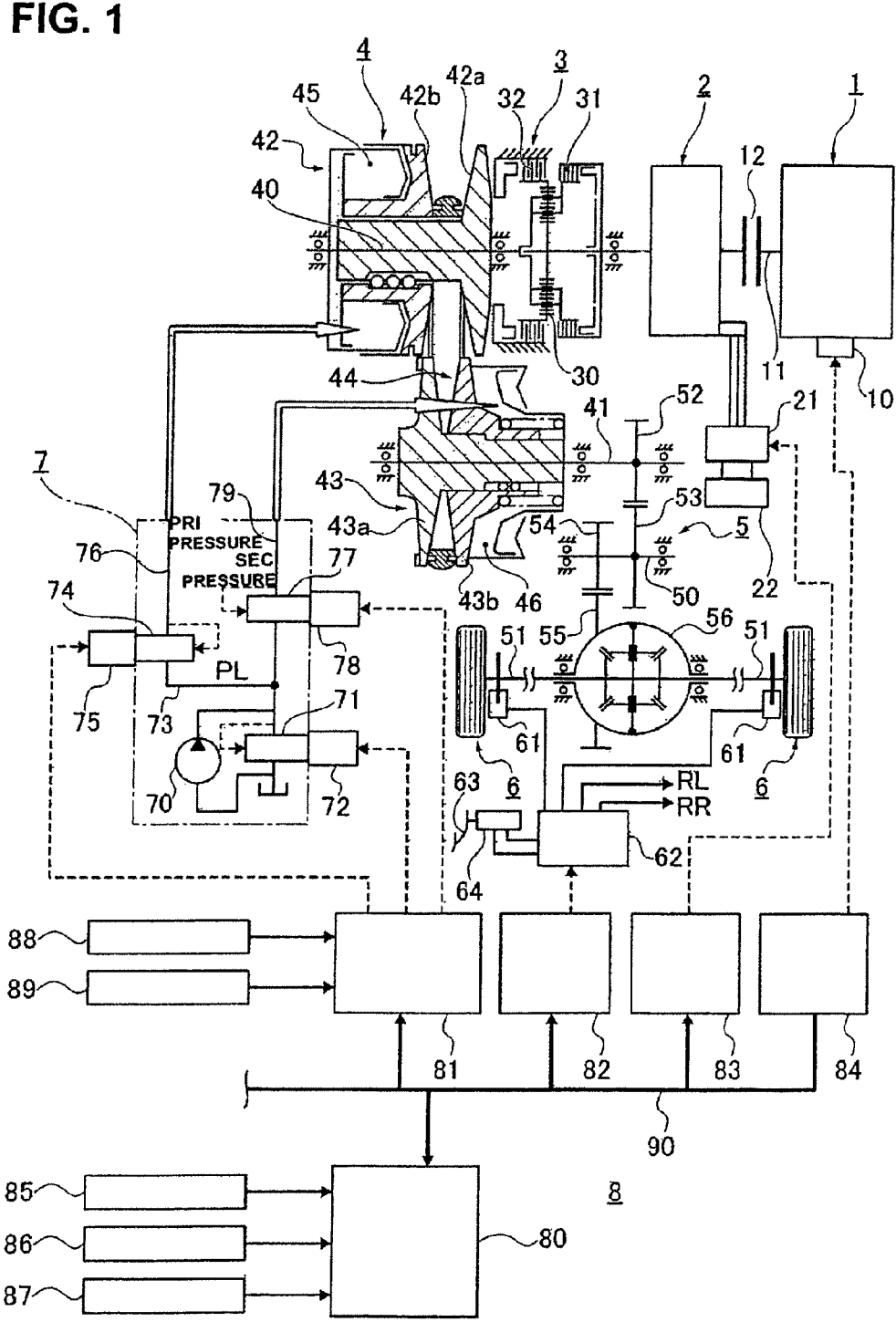
FIG. 1 is a general system diagram illustrating a drive system and a control system of a FF (front-engine front-drive) hybrid vehicle equipped with a belt-type continuously variable transmission to which the control device of a first embodiment is applied.

Preferred embodiments, which realize a control device for a belt-type continuously variable transmission of the present invention, are hereinafter described with reference to the first embodiment shown in the drawings.

First Embodiment

First of all, the configuration of the control device is explained.

In explaining the configuration, the configuration of the control device for the belt-type continuously variable transmission (CVT) of the first embodiment is classified into four sections, that is, "HYBRID DRIVE SYSTEM CONFIGURATION", "PULLEY HYDRAULIC PRESSURE CONTROL SYSTEM CONFIGURATION", "HYBRID ELECTRONIC CONTROL SYSTEM CONFIGURATION", and "CVT INPUT-TORQUE-DIRECTION-DEPENDENT PULLEY HYDRAULIC PRESSURE CONTROL PROCESSING CONFIGURATION".

[Hybrid Drive System Configuration (FIG. 1)]

As shown in FIG. 1, the hybrid drive system configuration is comprised of an engine 1 (a driving source), a motor generator 2 (a driving source), a forward/reverse changeover mechanism 3, a belt-type continuously variable speed change mechanism 4, a final reduction gear 5, and front-left and front-right road wheels 6, 6 (drive road wheels).

Engine 1 has an engine control actuator 10, which is configured to perform output torque control and speed control depending on opening and closing operations of a throttle valve, and fuel-cutoff operation. A first clutch 12 is interposed between the output shaft 11 of engine 10 and the motor shaft of motor generator 2 so that engagement/disengagement of this clutch is controlled responsively to a selected running mode.

Motor generator 2 is a three-phase alternating current synchronous type dynamo-electric machine. During power-running based on a positive torque command, the motor generator exerts a motoring function of an electric motor by converting an electric power discharged from a battery 22 into a three-phase alternating current power and by imposing the converted power thereto. On the other hand, during regenerative operation based on a negative torque command, the motor generator exerts a generating function of an electric generator by generating a three-phase alternating current power by rotational energy inputted from the drive road wheels 6, 6 (or the engine 1) and by converting the three-phase alternating current power into a single-phase direct-current (DC) power by an inverter 21 and by charging the converted DC power in the battery 22.

Forward/reverse changeover mechanism 3 is a changeover mechanism for switching the direction of input rotation to the belt-type continuously variable speed change mechanism 4 between a normal-rotational direction for forward-running and a reverse-rotational direction for reverse-running. Forward/reverse changeover mechanism 3 has a double-pinion type planetary gear 30, a forward clutch 31, and a reverse brake 32. By the way, belt-type continuously variable transmission CVT is constructed by the forward/reverse changeover mechanism 3 and the belt-type continuously variable speed change mechanism 4.

Belt-type continuously variable speed change mechanism 4 has a continuously variable speed-change function so that a transmission ratio (a pulley ratio) corresponding to a ratio of input rotation speed of a transmission input shaft 40 and output rotation speed of a transmission output shaft 41 is steplessly varied by changing a contact radius of a belt. Belt-type continuously variable speed change mechanism 4 has a primary pulley 42, a secondary pulley 43, and a belt 44. The primary pulley 42 is constructed by a fixed pulley 42a and a sliding pulley 42b. A sliding motion of sliding pulley 42b is produced by a primary hydraulic pressure introduced into a primary hydraulic chamber 45. The secondary pulley 43 is constructed by a fixed pulley 43a and a sliding pulley 43b. A sliding motion of sliding pulley 43b is produced by a secondary hydraulic pressure introduced into a secondary hydraulic chamber 46. Belt 44 is wrapped around across a V-shaped sheave surface of the primary pulley 42 and a V-shaped sheave surface of the secondary pulley 43. Belt 44 is constructed by two sets of stacked rings, each set comprised of a plurality of annular rings stacked from the inside to the outside, and a large number of elements each formed of a punched plate and sandwiched by the above-mentioned two sets of stacked rings so that these elements are connected to each other and formed into an annular shape.

Final reduction gear 5 is a mechanism configured to reduce transmission output rotation from the transmission output shaft 41 of belt-type continuously variable speed change mechanism 4, and to transmit the reduced output rotation to front-left and front-right road wheels 6, 6, while carrying out a differential function. Final reduction gear 5 is interposed among the transmission output shaft 41, an idler shaft 50, and left and right drive shafts 51, 51. The final reduction gear has a first gear 52 having a speed-reduction function, a second gear 53, a third gear 54, a fourth gear 55, and a differential gear 56 having a differential function.

Wheel cylinders 61, 61, serving as fluid-pressure brake devices, are attached to front-left and front-right road wheels 6, 6, for braking respective brake disks by brake-fluid pressures. The brake-fluid pressures to respective wheel cylinders 61, 61 are produced by means of a brake-fluid pressure actuator 62, which is provided in a middle of each individual brake-fluid line from a master cylinder 64 that converts a brake depression force on a brake pedal 63 into a brake-fluid pressure. By the way, brake-fluid pressure actuator 62 is configured to produce brake-fluid pressures to rear-left and rear-right road wheels (RL, RR).

As a variety of different driving modes, the FF hybrid vehicle has an electric vehicle mode (hereinafter referred to as "EV mode"), a hybrid vehicle mode (hereinafter referred to as "HEV mode"), and a driving-torque control mode (hereinafter referred to as "WSC (Wet Start Clutch) mode").

The previously-discussed "EV mode" is a mode in which the first clutch 12 is in a disengaged state and only the motor generator 2 serves as a driving source. The "EV mode" is comprised of a motoring mode (motor power-running) and a generator generating mode (generator regeneration). The "EV mode" is selected for instance in the case of a low required driving force and a battery SOC (state of charge, i.e., electric power stored in the battery) being ensured.

The previously-discussed "HEV mode" is a mode in which the first clutch 12 is in an engaged state and the engine 1 and the motor generator 2 both serve as a driving source. The "HEV mode" is comprised of a motor-assist mode (motor power-running), an engine generating mode (generator regeneration), and a speed-reduction regenerative power generation mode (generator regeneration). The "HEV mode" is selected for instance in the case of a high required driving force or a lack of the battery SOC.

The previously-discussed "WSC mode" is a mode in which a second clutch (the forward clutch 31 during forward movement, the reverse brake 32 during backward movement) is brought into a slip-engagement state because of the drive system without a rotation difference absorption element like a torque converter, so as to control the torque transmission capacity of the second clutch. The torque transmission capacity of the second clutch is controlled to bring the driving force transmitted through the second clutch closer to a required driving force representative of the operation amount of an accelerator pedal by the driver. The "WSC mode" is selected in an operating range in which the engine revolution speed is reduced below an idle speed, for instance when starting the vehicle from a mode-selection state of the "HEV mode".

[Pulley Hydraulic Pressure Control System Configuration (FIG. 1)]

As shown in FIG. 1, the pulley hydraulic pressure control system configuration is equipped with a speed-change (ratio-change) hydraulic pressure control unit 7 of a dual pressure-regulation system that produces both the primary hydraulic pressure Ppri introduced into the primary hydraulic chamber 45 and the secondary hydraulic pressure Psec introduced into the secondary hydraulic chamber 46.

The speed-change hydraulic pressure control unit 7 is equipped with an oil pump 70, a regulator valve 71, a line pressure solenoid 72, a line pressure oil passage 73, a first pressure regulating valve 74, a primary hydraulic pressure solenoid 75, a primary hydraulic pressure oil passage 76, a second pressure regulating valve 77, a secondary hydraulic pressure solenoid 78, and a secondary hydraulic pressure oil passage 79.

The regulator valve 71 is a valve in which a discharge pressure from the oil pump 70 is used as a source pressure and which is configured to regulate a line pressure PL. Regulator valve 71 has the line pressure solenoid 72 for pressure-regulating a pressure of oil force-fed from the oil pump 70 into a prescribed line pressure PL responsively to a command from a CVT control unit 81.

The first pressure regulating valve 74 is a valve in which the line pressure PL produced by the regulator valve 71 is used as a source pressure and which is configured to produce the primary hydraulic pressure Ppri introduced into the primary hydraulic chamber 45. The first pressure regulating valve 74 has the primary hydraulic pressure solenoid 75 for applying an operating signal pressure to the spool of the first pressure regulating valve 74 responsively to a command from the CVT control unit 81.

The second pressure regulating valve 77 is a valve in which the line pressure PL produced by the regulator valve 71 is used as a source pressure and which is configured to produce the secondary hydraulic pressure Psec introduced into the secondary hydraulic chamber 46. The second pressure regulating valve 77 has the secondary hydraulic pressure solenoid 78 for applying an operating signal pressure to the spool of the second pressure regulating valve 77 responsively to a command from the CVT control unit 81.

[Hybrid Electronic Control System Configuration (FIG. 1)]

As shown in FIG. 1, a hybrid electronic control system 8 of the hybrid electronic control system configuration is comprised of a hybrid control module 80, the CVT control unit 81, a brake control unit 82, a motor control unit 83, and an engine control unit 84. By the way, the hybrid control module 80 and each of the control units 81, 82, 83, and 84 are connected to each other via a CAN (controller area network) communication line 90 so as to permit mutual exchange of information among them.

The previously-discussed hybrid control module 80 is configured to manage the entire consumed energy of the vehicle and to carry an integrated control function that realizes vehicle running with a highest efficiency. Hybrid control module 80 is also configured to receive input information from each of an accelerator opening sensor 85, vehicle speed sensor 86, and a brake stroke sensor 87 and the like, and necessary information from the CAN communication line. Hybrid control module 80 is configured to have a driving torque operation part that calculates a target driving torque and an actual driving torque during accelerator depressing operation by the driver and a braking torque operation part that calculates a target braking torque and an actual braking torque during brake depressing operation by the driver. The hybrid control module is also configured to have a cooperative regeneration control part in which the highest possible regenerative braking torque, produced by the motor generator 2 and constructing part of the target braking torque, is first determined, and then the remaining torque obtained by subtracting the previously-noted regenerative braking torque from the target braking torque is set as a fluid-pressure braking torque so as to achieve the target braking torque by the summed value of the regenerative braking torque and the fluid-pressure braking torque. Furthermore, the hybrid control module is configured to have a regenerative control section that performs energy-regeneration by the motor generator 2 during deceleration.

The previously-discussed CVT control unit 81 receives necessary information from a primary rotation sensor 88, a secondary rotation sensor 89, and the like, for executing various hydraulic pressure controls of the belt-type continuously variable transmission CVT, that is, line pressure control, speed-change hydraulic pressure control, forward/reverse changeover control, and the like. The line pressure control is performed by outputting a control command for obtaining a target line pressure, determined based on the transmission input torque and the like, to the line pressure solenoid 72. The speed-change hydraulic pressure control is performed by outputting control commands for obtaining a target transmission ratio, determined based on vehicle speed VSP, accelerator opening APO, and the like, to the primary hydraulic pressure solenoid 75 and the secondary hydraulic pressure solenoid 78. The forward/reverse changeover control is performed by engaging the forward clutch 31 when the selected range position is a forward-running range such as a D range, and performed by engaging the reverse brake 32 when the selected range position is an R (reverse) range.

The previously-discussed brake control unit 82 is configured to output a driving command based on a control command from the hybrid control module 80 to the brake-fluid pressure actuator 62. The brake control unit sends information about actual fluid-pressure braking torque, obtained by monitoring brake-fluid pressure produced by the brake-fluid pressure actuator 62, to the hybrid control module 80.

The previously-discussed motor control unit 83 is configured to output either a target power-running command (a positive torque command) or a target regenerative command (a negative torque command), determined based on a control command from the hybrid control module 80, to the inverter 21. The motor control unit sends information about actual motor driving torque, obtained by detecting a motor applied electric current value (a motor driving current value) and the like, or information about actual generator braking torque to the hybrid control module 80.

The previously-discussed engine control unit 84 is configured to output a driving command based on a control command from the hybrid control module 80 to the engine control actuator 10. The engine control unit sends information about actual engine driving torque, obtained by revolution speed of engine 1 and fuel injection amount and the like, to the hybrid control module 80.

[CVT Input-Torque-Direction-Dependent Pulley Hydraulic Pressure Control Processing Configuration]

Figure 2:
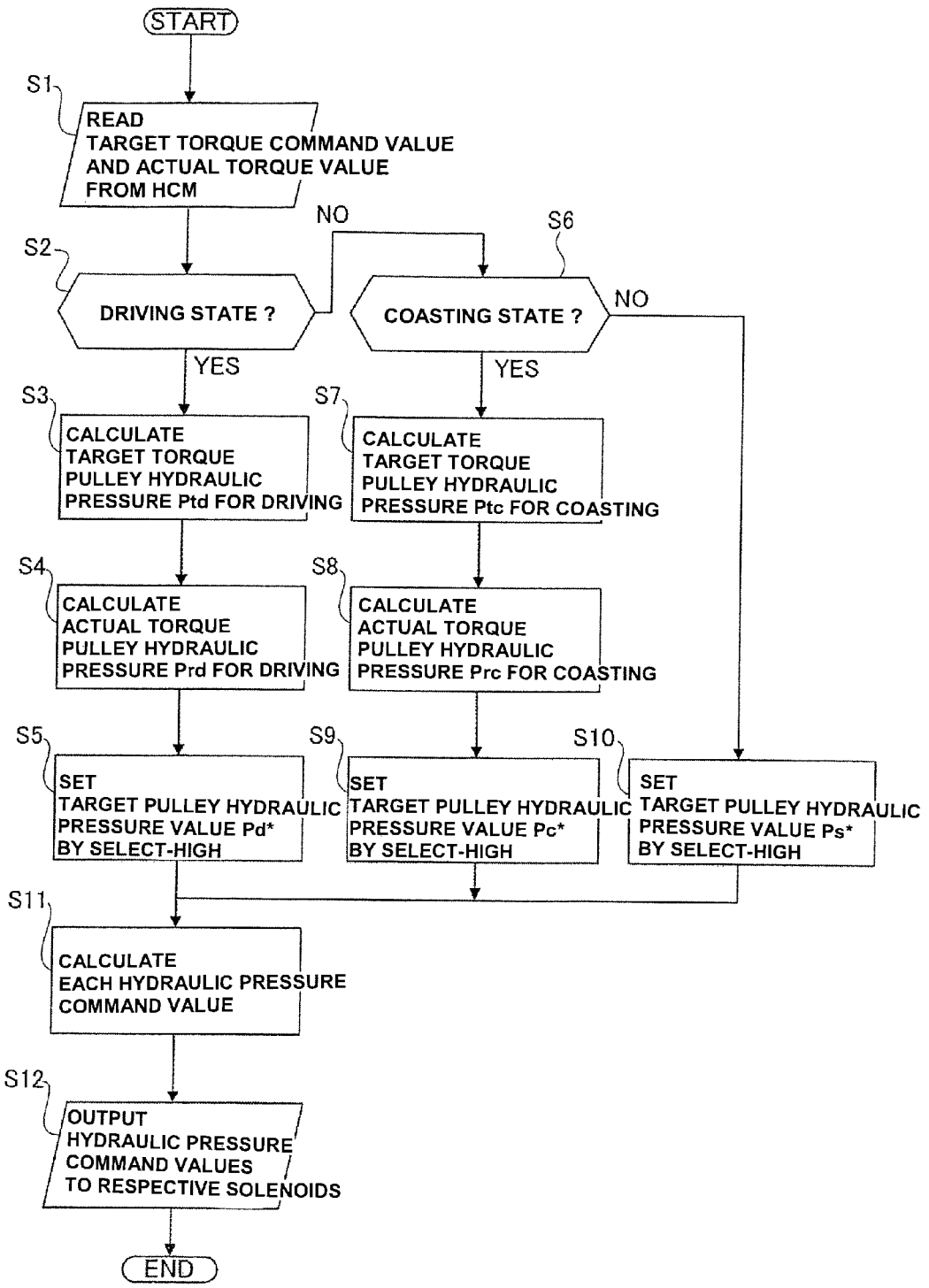
FIG. 2 is a flowchart illustrating the flow of input-torque-direction-dependent CVT hydraulic pressure control processing executed by a CVT control unit of the first embodiment.
Figure 3:
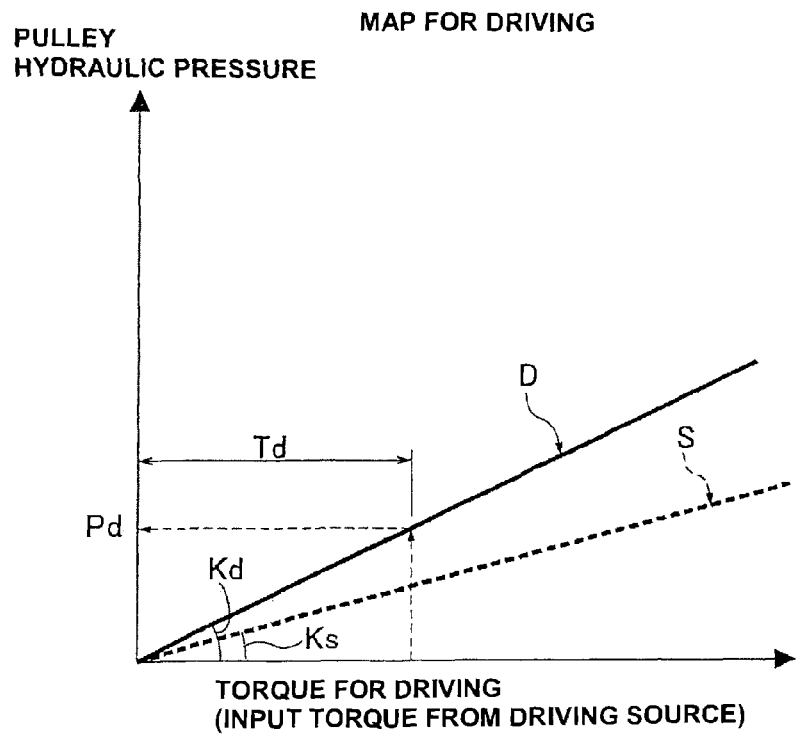
FIG. 3 is a map for driving illustrating a hydraulic pressure characteristic for driving showing the relation between torque for driving and pulley hydraulic pressure, for when the decision that the operating state is a driving state has been made by the CVT hydraulic pressure control processing.
Figure 4:
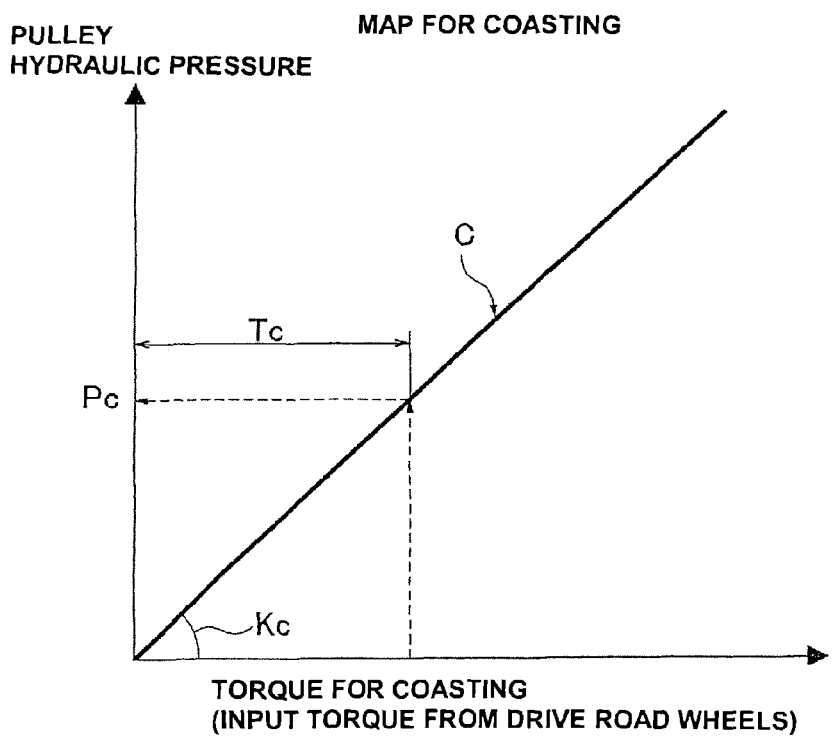
FIG. 4 is a map for coasting illustrating a hydraulic pressure characteristic for coasting showing the relation between torque for coasting and pulley hydraulic pressure, for when the decision that the operating state is a coasting state has been made by the CVT hydraulic pressure control processing.

FIG. 2 shows the flow of CVT-input-torque-direction-dependent pulley hydraulic pressure control processing executed by the CVT control unit 81. FIG. 3 shows the map for driving, whereas FIG. 4 shows the map for coasting. Respective steps of the flowchart of FIG. 2 illustrating the CVT-input-torque-direction-dependent pulley hydraulic pressure control processing are hereinafter explained. By the way, the flowchart of FIG. 2 is repeatedly executed as time-triggered routines every predetermined time intervals.

At step S1, a target torque command value and an actual torque value from hybrid control module (HCM) 80 are read, and then the routine proceeds to step S2.

During accelerator depressing operation by the driver in an EV mode or a HEV mode, a target driving torque, which is calculated by accelerator opening APO and vehicle speed VSP, is set as a target torque command value for driving. Also, in the EV mode, information about actual motor driving torque, obtained by detecting a motor driving current value and the like, is set as an actual torque value. In the HEV mode, the summed value obtained by adding an actual driving torque of engine 1 to an actual torque value for motor generator 2 is set as an actual torque value for driving.

When cooperative regeneration control is executed during brake depressing operation by the driver in an EV mode or a HEV mode, a target regenerative command value (a negative torque command value) based on a calculated target regenerative torque and outputted to the motor generator 2 is set as a target torque command value for coasting. Also, during the cooperative regeneration control, information about actual generator braking torque, obtained by detecting a motor-generator power generation current value and the like, is set as an actual torque value for coasting.

Subsequently to reading of the target torque command value and the actual torque value through step S1, at step S2 a check is made to determine whether the operating state is a driving state. When the answer to this step is YES (i.e., a driving state), the routine proceeds to step S3. Conversely when the answer is NO (a state other than a driving state), the routine proceeds to step S6.

Hereupon, the term "driving state" means a state where the direction of an input torque inputted to the belt-type continuously variable transmission CVT is a direction in which the drive road wheels are driven by the input torque from the driving source. For instance, when the target driving torque calculated by accelerator opening APO and vehicle speed VSP exceeds a preset driving-decision threshold value, it is determined that the operating state is a driving state.

Subsequently to the decision made by step S2 that the operating state is a driving state, at step S3 a target torque corresponding pulley hydraulic pressure Ptd for driving is calculated based on the target torque command value for driving and the map for driving shown in FIG. 3, and then the routine proceeds to step S4.

Hereupon, the target torque corresponding pulley hydraulic pressure Ptd is calculated based on a hydraulic pressure characteristic D for driving, which characteristic has a gradient Kd shown in FIG. 3, while setting the target torque command value for driving as a torque for driving.

Subsequently to the arithmetic operation made by step S3 for target torque corresponding pulley hydraulic pressure Ptd for driving, at step S4 an actual torque corresponding pulley hydraulic pressure Prd for driving is calculated based on the actual torque value for driving and the map for driving shown in FIG. 3, and then the routine proceeds to step S5.

Hereupon, the actual torque corresponding pulley hydraulic pressure Prd is calculated based on the hydraulic pressure characteristic D for driving, which characteristic has the gradient Kd shown in FIG. 3, while setting the actual torque value for driving as a torque for driving.

Subsequently to the arithmetic operation made by step S4 for actual torque corresponding pulley hydraulic pressure Prd for driving, at step S5 a higher one of the target torque corresponding pulley hydraulic pressure Ptd for driving calculated by step S3 and the actual torque corresponding pulley hydraulic pressure Prd for driving calculated by step S4 is selected by select-HIGH. The selected hydraulic pressure is set as a target pulley hydraulic pressure value Pd* for driving, and then the routine proceeds to step S11.

Subsequently to the decision made by step S2 that the operating state is a state other than a driving state, at step S6 a check is made to determine whether the operating state is a coasting state. When the answer to this step is YES (i.e., a coasting state), the routine proceeds to step S7. Conversely when the answer is NO (a state other than a coasting state), the routine proceeds to step S10.

Hereupon, the term "coasting state" means a state where the direction of an input torque inputted to the belt-type continuously variable transmission CVT is a direction in which the driving source is co-rotated by the input torque from the drive road wheels. For instance, when the target regenerative torque calculated during execution of the cooperative regeneration control exceeds a preset coasting-decision threshold value, it is determined that the operating state is a coasting state.

Subsequently to the decision made by step S6 that the operating state is a coasting state, at step S7 a target torque corresponding pulley hydraulic pressure Ptc for coasting is calculated based on the target torque command value for coasting and the map for coasting shown in FIG. 4, and then the routine proceeds to step S8.

Hereupon, the target torque corresponding pulley hydraulic pressure Ptc is calculated based on a hydraulic pressure characteristic C for coasting, which characteristic has a gradient Kc (>Kd) shown in FIG. 4, while setting the target torque command value for coasting as a torque for coasting. The setting of the gradient Kc shown in FIG. 4 greater than the gradient Kd shown in FIG. 3 means that the pulley hydraulic pressure for an input torque, derived from the map for coasting, is set higher than that derived from the map for driving.

Subsequently to the arithmetic operation made by step S7 for target torque corresponding pulley hydraulic pressure Ptc for coasting, at step S8 an actual torque corresponding pulley hydraulic pressure Prc for coasting is calculated based on the actual torque value for coasting and the map for coasting shown in FIG. 4, and then the routine proceeds to step S9.

Hereupon, the actual torque corresponding pulley hydraulic pressure Prc is calculated based on the hydraulic pressure characteristic C for coasting, which characteristic has the gradient Kc (>Kd) shown in FIG. 4, while setting the actual torque value for coasting as a torque for coasting.

Subsequently to the arithmetic operation made by step S8 for actual torque corresponding pulley hydraulic pressure Prc for coasting, at step S9 a higher one of the target torque corresponding pulley hydraulic pressure Ptc for coasting calculated by step S7 and the actual torque corresponding pulley hydraulic pressure Prc for coasting calculated by step S8 is selected by select-HIGH. The selected hydraulic pressure is set as a target pulley hydraulic pressure value Pc* for coasting, and then the routine proceeds to step S11.

Subsequently to the decision made by step S6 that the operating state is a state other than a coasting state, at step S10 a target torque corresponding pulley hydraulic pressure Pts and an actual torque corresponding pulley hydraulic pressure Prs are calculated based on the target torque command value, the actual torque value, and a low-torque-side hydraulic pressure characteristic S indicated by the broken line in FIG. 3. A higher one of the target torque corresponding pulley hydraulic pressure Pts and the actual torque corresponding pulley hydraulic pressure Prs is selected by select-HIGH. The selected hydraulic pressure is set as a target pulley hydraulic pressure value Ps* for a low-torque range, and then the routine proceeds to step S11.

Hereupon, owing to a low-torque range, the gradient Ks of the low-torque-side map characteristic S is set less than the gradient Kd of the hydraulic pressure characteristic D for driving, so as to reduce friction between the belt 44 and each of pulleys 42, 43.

Subsequently to the setting of any one of the target pulley hydraulic pressure values Pd*, Pc*, and Ps* set at respective steps S5, S9, and S10, at step S11 the calculated one of the target pulley hydraulic pressure values Pd*, Pc*, and Ps* is set as a final target pulley hydraulic pressure value P*. A line pressure command value for ensuring the target pulley hydraulic pressure value P* is calculated, and then the hydraulic-pressure distribution between primary hydraulic pressure Ppri and secondary hydraulic pressure Psec for obtaining a target transmission ratio at that time is determined. A primary hydraulic pressure command value and a secondary hydraulic pressure command value are calculated based on the determined hydraulic-pressure distribution, and then the routine proceeds to step S12.

Subsequently to the arithmetic operation made by step S11 for the line pressure command value, the primary hydraulic pressure command value, and the secondary hydraulic pressure command value, at step S12 the line pressure command value is outputted to the line pressure solenoid 72, the primary hydraulic pressure command value is outputted to the primary hydraulic pressure solenoid 75, and the secondary hydraulic pressure command value is outputted to the secondary hydraulic pressure solenoid 78. The routine proceeds to "SEND".

The operation is hereinafter explained.

In explaining the operation, the operation of the control device for the belt-type continuously variable transmission CVT of the first embodiment is classified into "CVT INPUT-TORQUE-DIRECTION-DEPENDENT PULLEY HYDRAULIC PRESSURE CONTROL PROCESSING OPERATION" and "PULLEY HYDRAULIC PRESSURE CONTROL OPERATION".

[CVT Input-Torque-Direction-Dependent Pulley Hydraulic Pressure Control Processing Operation]

When the direction of an input torque inputted to the belt-type continuously variable transmission CVT corresponds to a driving state where the input torque is directed from the driving source (engine 1, motor generator 2) toward drive road wheels 6, 6, in the flowchart of FIG. 2 the flow defined by step S1→step S2→step S3→step S4→step S5→step S11→step S12→END is repeatedly executed.

That is, through steps S3, S4, and S5, target torque corresponding pulley hydraulic pressure Ptd and actual torque corresponding pulley hydraulic pressure Prd are calculated based on a target torque command value, an actual torque value, and the hydraulic pressure characteristic D for driving, which characteristic is indicated by the solid line in FIG. 3, and then a higher one of these two calculated hydraulic pressures is selected by select-HIGH. The selected hydraulic pressure is set as a target pulley hydraulic pressure value Pd* for driving.

In contrast when the direction of an input torque inputted to the belt-type continuously variable transmission CVT corresponds to a coasting state where the input torque is directed from the drive road wheels 6, 6 toward the driving source (engine 1, motor generator 2), in the flowchart of FIG. 2 the flow defined by step S1→step S2→step S6→step S7→step S8→step S9→step S11→step S12→END is repeatedly executed.

That is, through steps S7, S8, and S9, target torque corresponding pulley hydraulic pressure Ptc and actual torque corresponding pulley hydraulic pressure Prc are calculated based on a target torque command value, an actual torque value, and the hydraulic pressure characteristic C for coasting, which characteristic is indicated by the solid line in FIG. 4, and then a higher one of these two calculated hydraulic pressures is selected by select-HIGH. The selected hydraulic pressure is set as a target pulley hydraulic pressure value Pc* for coasting.

Hereupon, on the assumption that the absolute value of torque Td for driving and the absolute value of torque Tc for coasting are equal to each other, when pulley hydraulic pressure Pd for driving is compared to pulley hydraulic pressure Pc for coasting, as can be appreciated from comparison between the characteristics of FIGS. 3-4, the relation defined by the inequality Pd<Pc is established.

Furthermore, when the magnitude of an input torque inputted to the belt-type continuously variable transmission CVT is small and thus it is determined that the operating state is a state other than a driving state and a coasting state, in the flowchart of FIG. 2 the flow defined by step S1→step S2→step S6→step S10→step S11→step S12→END is repeatedly executed.

That is, through step S10, target torque corresponding pulley hydraulic pressure Pts and actual torque corresponding pulley hydraulic pressure Prs are calculated based on a target torque command value, an actual torque value, and the low-torque-side hydraulic pressure characteristic S, which characteristic is indicated by the broken line in FIG. 3, and then a higher one of these two calculated hydraulic pressures is selected by select-HIGH. The selected hydraulic pressure is set as a target pulley hydraulic pressure value Ps* for a low-torque range.

[Pulley Hydraulic Pressure Control Operation]

FIG. 5 shows respective characteristics, obtained when, in the FF hybrid vehicle to which the control device of the first embodiment is applied, a series of operations has been made from accelerator depressing operation via accelerator releasing operation to brake depressing operation, in that order. The pulley hydraulic pressure control operation is hereunder explained in reference to FIG. 5.

At the time t1, when accelerator depressing operation has been made, a target torque command value (a target driving torque command value) exhibits such characteristic as to increase, while following an increase in accelerator opening. In contrast, an actual torque value (an actual driving torque value) exhibits such characteristic as to be brought closer to the target torque command value with a response delay from the increase in accelerator opening.

In this manner, in a driving state caused by the accelerator depressing operation, target torque corresponding pulley hydraulic pressure Ptd and actual torque corresponding pulley hydraulic pressure Prd are calculated based on a target driving torque command value, an actual driving torque value, and the hydraulic pressure characteristic D for driving, which characteristic is indicated by the solid line in FIG. 3. At this time, a higher one of these two calculated hydraulic pressures, that is, target torque corresponding pulley hydraulic pressure Ptd, is selected by select-HIGH. The selected hydraulic pressure is set as a target pulley hydraulic pressure value Pd* for driving.

Hereupon, the hydraulic responsiveness of pulley hydraulic pressure is lower than the responsiveness of an electric motor. Therefore, assuming that, in a driving state, a target pulley hydraulic pressure P* is set based on an actual driving torque value, there is a possibility of a slippage of belt 44 due to a lack of belt clamping force caused by the delay in a pulley hydraulic pressure rise.

In contrast to the above, when, in a driving state, target pulley hydraulic pressure value Pd* for driving is set based on a target torque command value, primary hydraulic pressure Ppri and secondary hydraulic pressure Psec can be increased in a first-in manner (i.e., by virtue of early pressure introduction) without response delay with respect to accelerator-pedal depressing operation. By the way, the shading area "E" of FIG. 5 represents a first-in area of pulley hydraulic pressure. Therefore, it is possible to ensure a belt clamping force at an earlier time even in a transient region in which the accelerator pedal is depressed, thereby preventing a slippage of belt 44. As a result of this, it is possible to transmit the driving torque from the driving source (engine 1, motor generator 2) to front-left and front-right road wheels 6, 6, while suppressing the loss in torque transmission, thereby ensuring the start/acceleration performance owing to the good driving performance.

After accelerator releasing operation has been made at the time t2, during the time interval from the time t2 when the accelerator releasing operation has been made to the time t3 when brake depressing operation starts, a target torque command value (a target driving torque command value) exhibits such characteristic as to decrease, while following a decrease in accelerator opening. In contrast, an actual torque value (an actual driving torque value) exhibits such characteristic as to be gradually brought closer to the target torque command value with a response delay from the decrease in accelerator opening.

In this manner, in a state where the magnitude of an input torque inputted to the belt-type continuously variable transmission CVT is small, target torque corresponding pulley hydraulic pressure Pts and actual torque corresponding pulley hydraulic pressure Prs are calculated based on a target driving torque command value, an actual driving torque value, and the low-torque-side hydraulic pressure characteristic S, which characteristic is indicated by the broken line in FIG. 3. At this time, a higher one of these two calculated hydraulic pressures, that is, actual torque corresponding pulley hydraulic pressure Prs, is selected by select-HIGH. The selected hydraulic pressure is set as a target pulley hydraulic pressure value Ps* for a low-torque range.

Hereupon, assuming that, during a transition from the driving state to the low-torque state, target pulley hydraulic pressure P* is set based on a target driving torque command value, there is a possibility that a slippage of belt 44 occurs due to an abrupt pulley hydraulic pressure decrease.

In contrast to the above, during a transition from the driving state to the low-torque state, target pulley hydraulic pressure P* is set based on an actual driving torque value having a response delay with respect to the target driving torque command value. By the way, the shading area "F" of FIG. 5 represents a late pressure release area of pulley hydraulic pressure. Therefore, it is possible to gradually reduce both the primary hydraulic pressure Ppri and the secondary hydraulic pressure Psec in concert with the decrease of the actual driving torque value, thereby preventing a slippage of belt 44 in a transient region corresponding to a transition period to a low-torque state caused by accelerator releasing operation.

At the time t3, when cooperative regeneration control is executed owing to brake depressing operation, a target torque command value (a target regenerative torque command value to motor generator 2) exhibits such characteristic as to decrease immediately when the cooperative regeneration control is initiated. In contrast, an actual torque value (an actual regenerative torque value) exhibits such characteristic as to be brought closer to the target regenerative torque command value with a response delay from the brake depressing operation.

In this manner, in a coasting state caused by the brake depressing operation, target torque corresponding pulley hydraulic pressure Ptc and actual torque corresponding pulley hydraulic pressure Prc are calculated based on a target regenerative torque command value, an actual regenerative torque value, and the hydraulic pressure characteristic C for coasting, which characteristic is indicated by the solid line in FIG. 4. At this time, a higher one of these two calculated hydraulic pressures, that is, target torque corresponding pulley hydraulic pressure Ptc, is selected by select-HIGH. The selected hydraulic pressure is set as a target pulley hydraulic pressure value Pc* for coasting.

In this manner, by setting the pulley hydraulic pressure for the input torque for the coasting state higher than that for the driving state, it is possible to ensure the belt clamping force that clamps the belt 44 even when a transition to coasting occurs. Therefore, even when the magnitude of input torque becomes greater in a steady coasting state, it is possible to ensure the satisfactory belt clamping force required for keeping the belt clamped, thereby preventing a slippage of belt 44.

In the case of cooperative regeneration control in a coasting state, immediately when the control is initiated and thus a target regenerative torque command value is outputted, owing to a high responsiveness of the generator a negative torque from motor generator 2 is produced. In other words, the motor generator 2 serves as a load placed on the driving system. Thus, a large magnitude of torque is abruptly inputted from front-left and front-right road wheels 6, 6 toward the belt-type continuously variable transmission CVT.

Hereupon, assuming that a pulley hydraulic pressure is set based on an actual regenerative torque value, there is a possibility of a slippage of belt 44 caused by the delay in a pulley hydraulic pressure rise in a transient region in which a coasting state starts. In contrast to the above, when, in a coasting state, target pulley hydraulic pressure P* is set based on a target regenerative torque command value, primary hydraulic pressure Ppri and secondary hydraulic pressure Psec can be increased in a first-in manner (i.e., by virtue of early pressure introduction) without response delay with respect to brake depressing operation. By the way, the shading area "G" of FIG. 5 represents a first-in area of pulley hydraulic pressure. Therefore, it is possible to ensure a belt clamping force at an earlier time even in a transient region in which the coasting state starts, thereby preventing a slippage of belt 44.

As a result of this, it is possible to transmit the torque inputted from front-left and front-right road wheels 6, 6 to the motor generator 2, while suppressing the loss in torque transmission during cooperative regeneration control, thereby enhancing the regenerative power generation efficiency attained by the motor generator 2.

The effects are hereinafter explained.

The effects, obtained by the belt-type continuously variable transmission CVT of the first embodiment, are hereinafter enumerated.

(1) In a control device for a belt-type continuously variable transmission equipped with a primary pulley (42) connected to a driving source (engine 1, motor generator 2), a secondary pulley (43) connected to drive road wheels (front-left and front-right road wheels 6, 6), a belt (44) wrapped around across the primary pulley (42) and the secondary pulley (43), and a pulley hydraulic pressure control means (CVT control unit 81) for controlling pulley hydraulic pressures to the primary pulley (42) and the secondary pulley (43), the control device has an operating state determination means (steps S2, S6 in FIG. 2) for determining whether an operating state is a driving state where the direction of an input torque inputted to the belt-type continuously variable transmission CVT is a direction in which the drive road wheels (front-left and front-right road wheels 6, 6) are driven by the input torque from the driving source (engine 1, motor generator 2) or a coasting state where the input torque direction is a direction in which the driving source (engine 1, motor generator 2) is co-rotated by the input torque from the drive road wheels (front-left and front-right road wheels 6, 6).

The pulley hydraulic pressure control means (FIG. 2) sets the pulley hydraulic pressure for the input torque for when it is determined that the operating state is the coasting state higher than the pulley hydraulic pressure for the input torque for when it is determined that the operating state is the driving state.

Therefore, it is possible to suppress a belt slippage that results in a belt-transmission torque loss in a coasting state in which torque is input from drive road wheels (front-left and front-right road wheels 6, 6).

(2) The pulley hydraulic pressure control means has a map (FIG. 3) for driving, corresponding to a hydraulic pressure characteristic D for driving showing a relation between torque for driving and pulley hydraulic pressure, and a map (FIG. 4) for coasting, corresponding to a hydraulic pressure characteristic C for coasting showing a relation between torque for coasting and pulley hydraulic pressure, a gradient Kc of the hydraulic pressure characteristic C for coasting being set greater than a gradient Kd of the hydraulic pressure characteristic D for driving such that, for a same input torque, the pulley hydraulic pressure derived from the map for coasting, is set higher than that derived from the map for driving.

The pulley hydraulic pressure control means (FIG. 2) sets a target pulley hydraulic pressure Pc*, using the map (FIG. 4) for coasting, when it is determined that the operating state is the coasting state.

Therefore, in addition to the effect (1), by the use of the map (FIG. 4) for coasting, together with the map (FIG. 3) for driving, it is easily perform pulley hydraulic pressure control in which the pulley hydraulic pressure for the input torque for when it is determined that the operating state is the coasting state is set higher than the pulley hydraulic pressure for the input torque for when it is determined that the operating state is the driving state.

(3) When it is determined that the operating state is the coasting state, the pulley hydraulic pressure control means (FIG. 2) calculates a target torque corresponding pulley hydraulic pressure Ptc for coasting, using the torque for coasting, corresponding to a target torque command value, and the hydraulic pressure characteristic C for coasting, calculates an actual torque corresponding pulley hydraulic pressure Prc for coasting, using the torque for coasting, corresponding to an actual torque value, and the hydraulic pressure characteristic C for coasting, and sets the target pulley hydraulic pressure Pc* as a higher one of the target torque corresponding pulley hydraulic pressure Ptc for coasting and the actual torque corresponding pulley hydraulic pressure Prc for coasting, selected by select-HIGH.

Therefore, in addition to the effect (2), in a transient region for coasting, occurring owing to brake depressing operation, it is possible to ensure the efficient regenerative-energy recovery and good braking performance by suppressing a slippage of belt 44 in a first-in manner of hydraulic pressure (i.e., by virtue of early pressure introduction).

(4) When it is determined that the operating state is the driving state, the pulley hydraulic pressure control means (FIG. 2) calculates a target torque corresponding pulley hydraulic pressure Ptd for driving, using the torque for driving, corresponding to a target torque command value, and the hydraulic pressure characteristic D for driving, calculates an actual torque corresponding pulley hydraulic pressure Prd for driving, using the torque for driving, corresponding to an actual torque value, and the hydraulic pressure characteristic D for driving, and sets the target pulley hydraulic pressure Pd* as a higher one of the target torque corresponding pulley hydraulic pressure Ptd for driving and the actual torque corresponding pulley hydraulic pressure Prd for driving, selected by select-HIGH.

Therefore, in addition to the effects (2) or (3), in a transient region for driving, occurring owing to accelerator depressing operation, it is possible to ensure the good driving performance by suppressing a slippage of belt 44 in a first-in manner of hydraulic pressure (i.e., by virtue of early pressure introduction).

(5) The driving source has a motor generator 2.

The operating state determination means (step S6 in FIG. 2) determines that the operating state is the coasting state when regenerative braking is performed by the motor generator 2.

Therefore, in addition to the effects (1) to (4), during braking or during deceleration in which regenerative braking is performed by the motor generator 2, it is possible to ensure the high regenerative power generation efficiency by suppressing a slippage of belt 44 in a first-in manner of hydraulic pressure (i.e., by virtue of early pressure introduction).

While the foregoing is a description of the control device for the belt-type continuously variable transmission of the first embodiment carried out the invention, it will be understood that the invention is not limited to the first embodiment shown and described herein, but that various changes and modifications may be made without departing from the scope or spirit of this invention as defined by the following claims.

In the first embodiment, the pulley hydraulic pressure control means is exemplified so as to set a target pulley hydraulic pressure, using a map (FIG. 4) for coasting, together with a map (FIG. 3) for driving. In lieu thereof, as a modification of pulley hydraulic pressure control means, a target pulley hydraulic pressure for an input torque may be set by correction operation whose correction coefficient varies depending on whether the operating state is a driving state or a coasting state.

In the first embodiment, a belt for use in a belt-type continuously variable transmission, is exemplified in a segmented belt 44 constructed by two sets of stacked rings and a large number of elements. In lieu thereof, a chain belt or another type of belt may be used as a belt for use in a belt-type continuously variable transmission.

In lieu of each of the maps of the first embodiment, for instance, a prescribed map in which a positive input torque is taken on the side of driving and a negative input torque is taken on the side of coasting may be applied. In this case, for identification, either a positive sign or a negative sign has to be attached to each of a target torque command value and an actual torque value, both read. For instance, during accelerator depressing operation by the driver in an EV mode or in a HEV mode, a target driving torque, calculated based on accelerator opening APO and vehicle speed VSP, is taken on the side of driving. That is, the target driving torque, to which a positive sign has been affixed, is set as a target torque command value. Also, in the EV mode, information about actual motor driving torque, obtained by detecting a motor driving current value and the like, is set as an actual torque value. In the HEV mode, the summed value obtained by adding an actual driving torque of engine 1 to an actual torque value of motor generator 2 and by affixing a positive sign thereto is set as an actual torque value for driving.

When cooperative regeneration control is executed during brake depressing operation by the driver in an EV mode or in a HEV mode, a target regenerative command value, which is based on a calculated target regenerative torque and outputted to the motor generator 2 and to which a negative sign is affixed, is set as a target torque command value for coasting. Also, during the cooperative regeneration control, information about actual generator braking torque, obtained by detecting a motor-generator power generation current value and the like and by affixing a negative sign thereto, is set as an actual torque value for coasting.

In the case of the previously-discussed arrangement, means for affixing a positive (+) or negative (−) sign to the input torque corresponds to an operating state determination means. Furthermore, respective target pulley hydraulic pressures, corresponding to the input torque to which a positive sign is affixed and the input torque to which a negative sign is affixed are set. In this case, the pulley hydraulic pressure for the input torque for when it is determined that the operating state is the coasting state is set higher than the pulley hydraulic pressure for the input torque for when it is determined that the operating state is the driving state.

In the first embodiment, the control device is exemplified in a FF hybrid vehicle equipped with a belt-type continuously variable transmission, but the invention may be applied to an engine vehicle on which a belt-type continuously variable transmission is mounted or an electric vehicle on which a belt-type continuously variable transmission is mounted. In brief, the inventive concept can be applied to any type of vehicle on which a belt-type continuously variable transmission whose shift control is performed by pulley hydraulic pressure is mounted.

The invention claimed is:

1. A control device for a belt-type continuously variable transmission equipped with a primary pulley connected to a driving source, a secondary pulley connected to drive road wheels, a belt wrapped around the primary pulley and the secondary pulley, and a pulley hydraulic pressure control means for controlling pulley hydraulic pressures to the primary pulley and the secondary pulley, comprising:

an operating state determination means for determining whether an operating state is a driving state where a direction of an input torque inputted to the belt-type continuously variable transmission is a direction in which the drive road wheels are driven by the input torque from the driving source or a coasting state where the input torque direction is a direction in which the driving source is co-rotated by the input torque from the drive road wheels, wherein the pulley hydraulic pressure control means sets the pulley hydraulic pressure for the input torque for when it is determined that the operating state is the coasting state higher than the pulley hydraulic pressure for the input torque for when it is determined that the operating state is the driving state, wherein the pulley hydraulic pressure control means has a map for driving, corresponding to a hydraulic pressure characteristic for driving showing a relation between torque for driving and pulley hydraulic pressure, and a map for coasting, corresponding to a hydraulic pressure characteristic for coasting showing a relation between torque for coasting and pulley hydraulic pressure, a gradient of the hydraulic pressure characteristic for coasting being set greater than a gradient of the hydraulic pressure characteristic for driving such that, for a same input torque, the pulley hydraulic pressure derived from the map for coasting is set higher than that derived from the map for driving, and wherein the pulley hydraulic pressure control means sets a target pulley hydraulic pressure, using the map for coasting, when it is determined that the operating state is the coasting state.

2. A control device for a belt-type continuously variable transmission as recited in claim 1, wherein:

when it is determined that the operating state is the coasting state, the pulley hydraulic pressure control means calculates a target torque corresponding pulley hydraulic pressure for coasting, using the torque for coasting, corresponding to a target torque command value, and the hydraulic pressure characteristic for coasting, and calculates an actual torque corresponding pulley hydraulic pressure for coasting, using the torque for coasting, corresponding to an actual torque value, and the hydraulic pressure characteristic for coasting, and sets the target pulley hydraulic pressure as a higher one of the target torque corresponding pulley hydraulic pressure for coasting and the actual torque corresponding pulley hydraulic pressure for coasting.

3. A control device for a belt-type continuously variable transmission as recited in claim 1 wherein:
   when it is determined that the operating state is the driving state, the pulley hydraulic pressure control means calculates a target torque corresponding pulley hydraulic pressure for driving, using the torque for driving, corresponding to a target torque command value, and the hydraulic pressure characteristic for driving, and calculates an actual torque corresponding pulley hydraulic pressure for driving, using the torque for driving, corresponding to an actual torque value, and the hydraulic pressure characteristic for driving, and sets the target pulley hydraulic pressure as a higher one of the target torque corresponding pulley hydraulic pressure for driving and the actual torque corresponding pulley hydraulic pressure for driving.

4. A control device for a belt-type continuously variable transmission as recited in claim 1, wherein:
   the driving source has a motor generator; and
   the operating state determination means determines that the operating state is the coasting state when regenerative braking is performed by the motor generator.

5. A control device for a belt-type continuously variable transmission equipped with a primary pulley connected to a driving source, a secondary pulley connected to drive road wheels, a belt wrapped around the primary pulley and the secondary pulley, and a pulley hydraulic pressure control section configured to control pulley hydraulic pressures to the primary pulley and the secondary pulley, comprising:
   an operating state determination section configured to determine whether an operating state is a driving state where a direction of an input torque inputted to the belt-type continuously variable transmission is a direction in which the drive road wheels are driven by the input torque from the driving source or a coasting state where the input torque direction is a direction in which the driving source is co-rotated by the input torque from the drive road wheels,
   wherein the pulley hydraulic pressure control section is configured to set the pulley hydraulic pressure for the input torque for when it is determined that the operating state is the coasting state higher than the pulley hydraulic pressure for the input torque for when it is determined that the operating state is the driving state,
   wherein the pulley hydraulic pressure control section has a map for driving, corresponding to a hydraulic pressure characteristic for driving showing a relation between torque for driving and pulley hydraulic pressure, and a map for coasting, corresponding to a hydraulic pressure characteristic for coasting showing a relation between torque for coasting and pulley hydraulic pressure, a gradient of the hydraulic pressure characteristic for coasting being set greater than a gradient of the hydraulic pressure characteristic for driving such that, for a same input torque, the pulley hydraulic pressure derived from the map for coasting is set higher than that derived from the map for driving, and
   wherein the pulley hydraulic pressure control section sets a target pulley hydraulic pressure, using the map for coasting, when it is determined that the operating state is the coasting state.

6. A control device for a belt-type continuously variable transmission as recited in claim 5, wherein:
   when it is determined that the operating state is the coasting state, the pulley hydraulic pressure control section is configured to calculate a target torque corresponding pulley hydraulic pressure for coasting, using the torque for coasting, corresponding to a target torque command value, and the hydraulic pressure characteristic for coasting, and to calculate an actual torque corresponding pulley hydraulic pressure for coasting, using the torque for coasting, corresponding to an actual torque value, and the hydraulic pressure characteristic for coasting, and to set the target pulley hydraulic pressure as a higher one of the target torque corresponding pulley hydraulic pressure for coasting and the actual torque corresponding pulley hydraulic pressure for coasting.

7. A control device for a belt-type continuously variable transmission as recited in claim 5, wherein:
   when it is determined that the operating state is the driving state, the pulley hydraulic pressure control section is configured to calculate a target torque corresponding pulley hydraulic pressure for driving, using the torque for driving, corresponding to a target torque command value, and the hydraulic pressure characteristic for driving, and to calculate an actual torque corresponding pulley hydraulic pressure for driving, using the torque for driving, corresponding to an actual torque value, and the hydraulic pressure characteristic for driving, and to set the target pulley hydraulic pressure as a higher one of the target torque corresponding pulley hydraulic pressure for driving and the actual torque corresponding pulley hydraulic pressure for driving.

8. A control device for a belt-type continuously variable transmission as recited in claim 5, wherein:
   the driving source has a motor generator; and
   the operating state determination section is configured to determine that the operating state is the coasting state when regenerative braking is performed by the motor generator.

* * * * *